(12) United States Patent
Dahan et al.

(10) Patent No.: US 8,397,081 B2
(45) Date of Patent: Mar. 12, 2013

(54) DEVICE AND METHOD FOR SECURING SOFTWARE

(75) Inventors: Odi Dahan, Oranit (IL); Ori Goren, Kibutz Ruchama (IL); Yehuda Shvager, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 814 days.

(21) Appl. No.: 11/993,811

(22) PCT Filed: Jun. 22, 2005

(86) PCT No.: PCT/IB2005/052051
§ 371 (c)(1),
(2), (4) Date: Nov. 20, 2008

(87) PCT Pub. No.: WO2006/136881
PCT Pub. Date: Dec. 28, 2006

(65) Prior Publication Data
US 2009/0172414 A1    Jul. 2, 2009

(51) Int. Cl.
*G06F 11/30* (2006.01)
(52) U.S. Cl. ............. 713/190; 713/189; 726/1; 711/100
(58) Field of Classification Search ............ 713/190, 713/189; 726/1; 711/100
See application file for complete search history.

(56) References Cited

U.S. PATENT DOCUMENTS

| | | | |
|---|---|---|---|
| 4,874,902 A | 10/1989 | Huang | |
| 5,091,942 A | 2/1992 | Dent | |
| 5,515,540 A | 5/1996 | Grider et al. | |
| 5,898,776 A | 4/1999 | Apland et al. | |
| 6,158,005 A | 12/2000 | Bharathan et al. | |
| 6,304,970 B1 | 10/2001 | Bizzaro et al. | |
| 6,378,072 B1* | 4/2002 | Collins et al. | 713/187 |
| 6,466,048 B1 | 10/2002 | Goodman | |
| 6,704,871 B1* | 3/2004 | Kaplan et al. | 713/192 |
| 6,981,141 B1* | 12/2005 | Mahne et al. | 713/165 |
| 7,594,123 B2* | 9/2009 | Sako et al. | 713/193 |
| 7,929,704 B2* | 4/2011 | Hauge et al. | 380/277 |
| 2003/0026424 A1* | 2/2003 | McGarrahan et al. | 380/255 |
| 2003/0061488 A1 | 3/2003 | Huebler et al. | |

(Continued)

FOREIGN PATENT DOCUMENTS

| EP | 02982850 A | 1/1998 |
|---|---|---|
| EP | 0962850 A2 | 12/1999 |

(Continued)

OTHER PUBLICATIONS

Joy Algesheimer; Cryptographic Security for Mobile Code; Aug. 28, 2003; IBM Research; pp. 1-15.*

*Primary Examiner* — April Shan (57) ABSTRACT

A device includes a first memory unit adapted to store encrypted instructions, a processor adapted to execute decrypted instructions, a second memory unit accessible by the processor, and a decryption unit. The device includes a key database and a key selection circuit, wherein the key selection circuit is adapted to select a selected decryption key from the key database for decrypting encrypted instructions. The selection is responsive to a fixed selection information stored within the integrated circuit and to received key selection information. A method includes a stage of receiving encrypted instructions; and executing decrypted instructions by a processor. The method includes receiving key selection information, selecting a selected decryption key out of a key database in response to fixed selection information and to the received key selection information, and decrypting encrypted instructions using the selected decryption key.

23 Claims, 9 Drawing Sheets

U.S. PATENT DOCUMENTS

| | | |
|---|---|---|
| 2003/0084280 A1* | 5/2003 | Bryan et al. .................. 713/153 |
| 2003/0105678 A1* | 6/2003 | Bratton ........................ 705/26 |
| 2003/0133574 A1 | 7/2003 | Caronni et al. |
| 2003/0156715 A1* | 8/2003 | Reeds et al. .................. 380/37 |
| 2003/0177373 A1 | 9/2003 | Moyer et al. |
| 2003/0195855 A1* | 10/2003 | Parks et al. .................. 705/51 |
| 2004/0025034 A1* | 2/2004 | Alessi et al. ................. 713/189 |
| 2004/0196979 A1* | 10/2004 | Cheng et al. ................. 380/270 |
| 2005/0091520 A1 | 4/2005 | Khan et al. |
| 2005/0105738 A1* | 5/2005 | Hashimoto .................. 380/277 |
| 2006/0041747 A1* | 2/2006 | Okumura et al. ............ 713/168 |
| 2006/0126838 A1* | 6/2006 | Taieb et al. .................. 380/229 |
| 2006/0269063 A1* | 11/2006 | Hauge et al. ................. 380/262 |

FOREIGN PATENT DOCUMENTS

| | | |
|---|---|---|
| WO | 0233522 A1 | 4/2002 |
| WO | 2004088484 A1 | 10/2004 |

* cited by examiner

DEVICE AND METHOD FOR SECURING SOFTWARE

FIELD OF THE INVENTION

The present invention relates to devices and methods for securing software.

BACKGROUND OF THE INVENTION

Modern electrical circuits include software and hardware components. In many cases the software is copied in order to save development cost. The cloned software can be used by third parties on the same hardware platform that did not invest in developing the software and can provide cheaper products then the original developer of the software.

The hackers can download the software in various manners, and can even use devices testing and debugging capabilities to learn about the software.

Various attempts were made to prevent software cloning and/or to secure integrated circuits. U.S. patent application number 2003/0177373 of Moyer et al., titled "Integrated circuit security and method therefore", which is incorporated herein by reference, describes an integrated circuit that provides a security key base integrated circuit protection scheme.

U.S. Pat. No. 5,898,776 of Apland et al. titled "security antifuse that prevents readout of some but not other information from a programmed filed programmable gate array", which is incorporated herein by reference, describes an antifuse that can be programmed to disable access to a JTAG boundary scan register, while allowing access to a JTAG bypass register.

U.S. Pat. No. 5,091,942 of Dent, titled "Authentication system for digital cellular communication", which is incorporated herein by reference, describes a system and method that is used for authenticating mobile stations and base stations in a cellular communication network that uses a rolling key that includes historical information.

U.S. Pat. No. 6,158,005 of Bharathan et al., titled "Cloning protection scheme for a digital information playback device", which is incorporated herein by reference, describes a method and apparatus for cloning protection of a player. A unique identifier is required in order to enable the playback. The unique identifier is communicated to a server.

U.S. patent application publication serial number 2003/0061488 of Huebler at el., titled "Cloning protection for electronic equipment" which is incorporated herein by reference, describes a method and apparatus for protecting electronic devices from cloning that employ and electronic signature generated from an identification code for the electronic device, an international mobile equipment identifier, and a unique unchangeable identification for a hardware component of the electronic device code.

There is a need to provide efficient method and device for cloning protection and reverse engineering prevention.

SUMMARY OF THE PRESENT INVENTION

A device and a method for securing software, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Various figures illustrate non-limiting exemplary configurations of a device for securing software. It is noted that other configurations can be used without departing from the scope of the invention. For example, the amount of memory units that store the encrypted information may exceed one, the amount of integrated circuits within a device may differ than two, the amount of processors within a second integrated circuit may exceed one, and the like.

According to an embodiment of the invention a unique encryption key is used to encrypt instructions. The integrated circuit manufacturer can allow a first customer to access one set of keys and allow another customer to access a different set of keys, and thus prevent one customer from cloning the decrypted software of the other customer.

Figure 1:
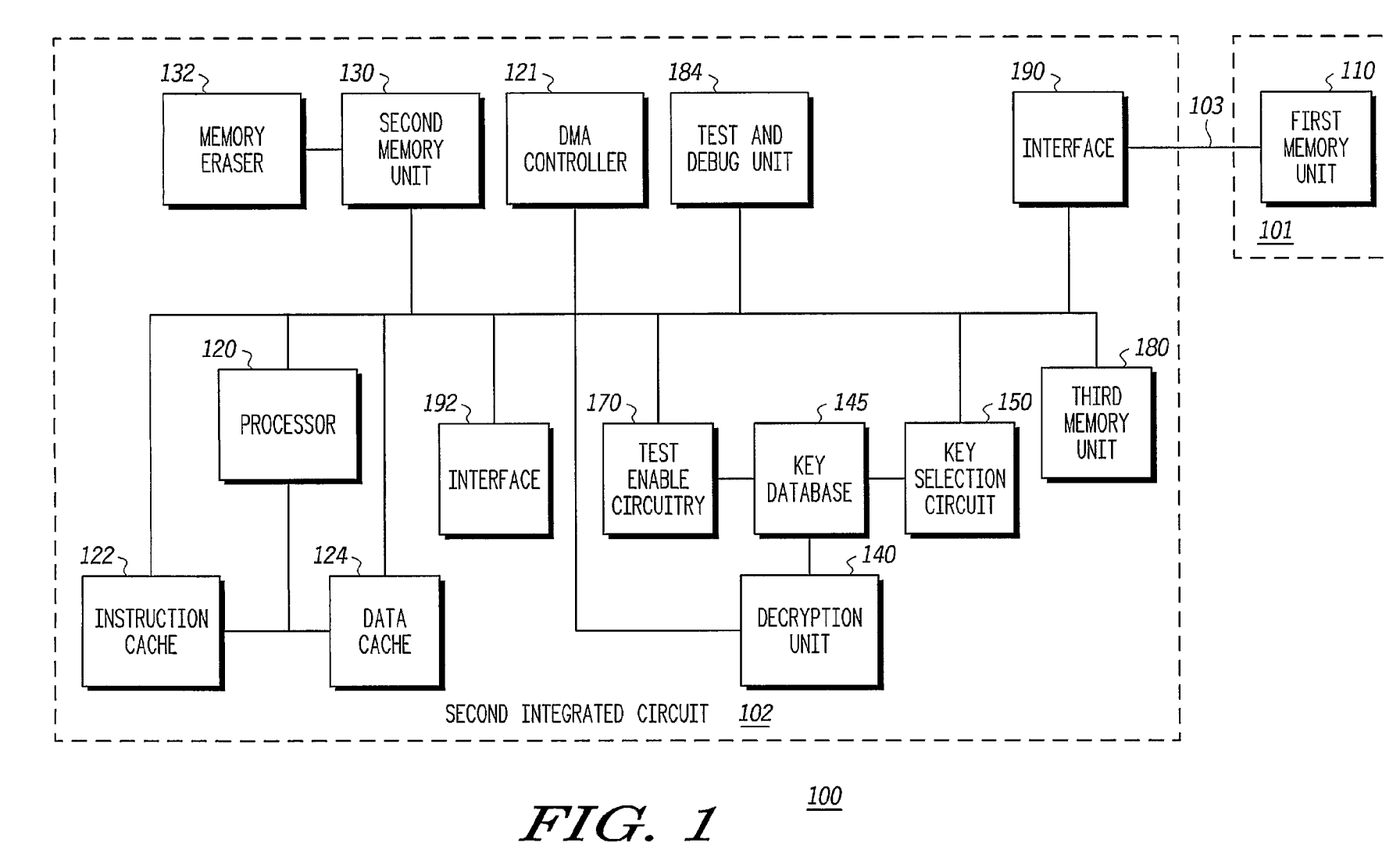
FIG. 1 illustrates a device according to an embodiment of the invention.

FIG. 1 illustrates a device 100, according to an embodiment of the invention.

Device 100 includes a first integrated circuit 101 and a second integrated circuit 102. The first integrated circuit 101 is connected to the second integrated circuit 102 by a bus 103.

Conveniently, the first integrated circuit 101 includes a first memory unit 110 that stores encrypted instructions.

The second integrated circuit 102 includes processor 120, second memory unit 130, memory eraser 132, a decryption unit 140, key database 145, key selection circuit 150, instruction cache 122, data cache 124, a third memory unit 180, a test and debug unit 184, and I/O interfaces 190 and 192.

According to an embodiment of the invention the key database is spread in a large area of the integrated circuit, and combined with various logic circuits, such as avoid microscopic detection of the keys.

The memory eraser 132 can be a part of the second memory unit 130. Conveniently it is a part of a built in self test (BIST) unit. It is capable of erasing one or more entries of the second memory unit 130. The erasure conveniently occurs in response to commends or control signals provided by the processor 120. The erasure of memory entries can be included in a booting sequence of the device 100.

It is further noted that processor 120 can erase the second memory unit 130 but it usually more efficient to use a memory eraser 132 while allowing the processor 120 to handle other tasks. It is further noted that other components, such as a DMA controller 121, can also erase the entries of the second memory unit 130.

The second memory unit 130 stores decrypted instructions and can also store these instructions in an encrypted format, before they are decrypted by decryption unit 140. It is noted that the second integrated circuit 102 can include multiple memory units for storing encrypted an/or decrypted instructions.

The processor 120, second memory unit 120, test and debug unit 184, interface 190, third memory unit 180, key selection circuit 150, test enable circuit 170, decryption unit 140, and interface 192 are connected to each other by a bus or a interconnecting mesh. It is noted that these components can be connected in various manners and that a DMA or other type of memory transfer controller or media access controller can manage the traffic over the bus or mesh.

It is further noted that the test and debug unit 184 can be split to a test unit and to a debug unit and that only one of said units can be included within the second integrated circuit 102 via interface 92. Interface 192 expects to read only the key. If the key does not match then the device will reset to avoid brute force attack. Conveniently, a test session or a debug session can initiate only if a user provides a selected decryption key to the second integrated circuit 102.

Conveniently, the key database 140, the key selection circuit 150 can not be accessed from outside the second integrated circuit 102, either by direct access, by testing or by debugging.

Conveniently, the access to the second memory unit 130 is limited such as to allow a test unit to read a certain entry of the second memory unit 130 only if that test unit has already written to this entry.

Conveniently, the instruction cache 122 and/or the data cache 124 are invalidated during a booting session or otherwise are configured not to provide content that was written to them before certain events (such as a reset) occurred.

Device 100 can include many interfaces. Conveniently, these interfaces are not direct access interfaces but rather controlled by processor 120. The control can be implemented by buffer descriptors or by single instructions. If device 100 includes some or more direct access interface than they are limited to certain memory spaces that do not include, for example, the second memory unit 130 or other entries that include decrypted instructions, or device 102 internal registers.

Conveniently, one interface, such as interface 190 is relatively slow, while the other interface 192 is relatively fast. The inventors used a slow I²C interface and a fast Ethernet interface, although other interface adapted to other communication protocols can be utilized. Encrypted data or instructions can be retrieved via one or more of these interfaces.

The key selection circuit 150 is adapted to select a selected decryption key from the key database 145 for decrypting encrypted instructions. The selection is responsive to a fixed selection information stored within the integrated circuit and to received key selection information.

The fixed selection information can be set by the manufacturer of the second integrated circuit 102. Each client can receive a different fixed selection information, without knowing this fixed selection information and without knowing the fixed selection information of other clients.

Conveniently, the fixed selection information can be implemented by fuses and the like. It is should not be a part of any scan chain and can not be either tested or debugged.

Conveniently, each fixed selection information can select a certain group of keys within the key database 145. Different fixed selection information conveniently do not enable a user to select the same encryption key.

The fixed selection information can be implemented by fuses, pull down circuits and/or pull up circuits and the like. It is conveniently hidden from a user. For example, it is not a part of any scan chain and can not be either tested or debugged.

Even if a user knows the received key selection information, he will not be able to decrypt the software because he can not access that key, regardless of the key information he feeds to the key selection circuit 145.

According an embodiment of the invention the encrypted instructions are also hashed before being stored in the first memory unit 110. Conveniently the encrypted instructions are hashed such as to allow the second integrated circuit 102 to check that the encrypted instructions were not tampered or altered by a third party.

Conveniently, the hashing utilizes the selected decryption key.

Conveniently, the encryption unit 140 does not fetch the whole bulk of encrypted instructions at once, but it rather fetches instruction groups. Conveniently, the hashing is applied on groups of instructions. This allows the encryption unit 140 to perform de-hashing operations on a group of instructions before encrypting these instructions.

Those of skill in the art will appreciate that the hashing can be applied on multiple instruction that differ by size from the size of the instruction groups fetches by the decryption unit 140.

According to another embodiment of the invention the de-hashing is executed by a component that differs from the decryption unit 140. If one unit performs decryption and another performs de-hashing than these units can operate in a pipelined manner. According to a further embodiment of the invention other integrity checking schemes are applied.

According to an embodiment of the invention the encrypted instructions (or at least some of these instructions) are decrypted during a booting session of the second integrated circuit 102. The booting session can start by retrieving an initial booting code from the third memory unit 180 (that can be a ROM type memory unit). The execution of the initial booting code initiates the decryption session.

According to yet another embodiment of the invention the processor 120 does not execute code unless it is provided from certain locations, such as from the first memory unit 110. Conveniently, even if the instruction was retrieved from a predefined location it is de-hashed and only if the de-hashing stage was successful it is decrypted and only then executed.

Figure 2:
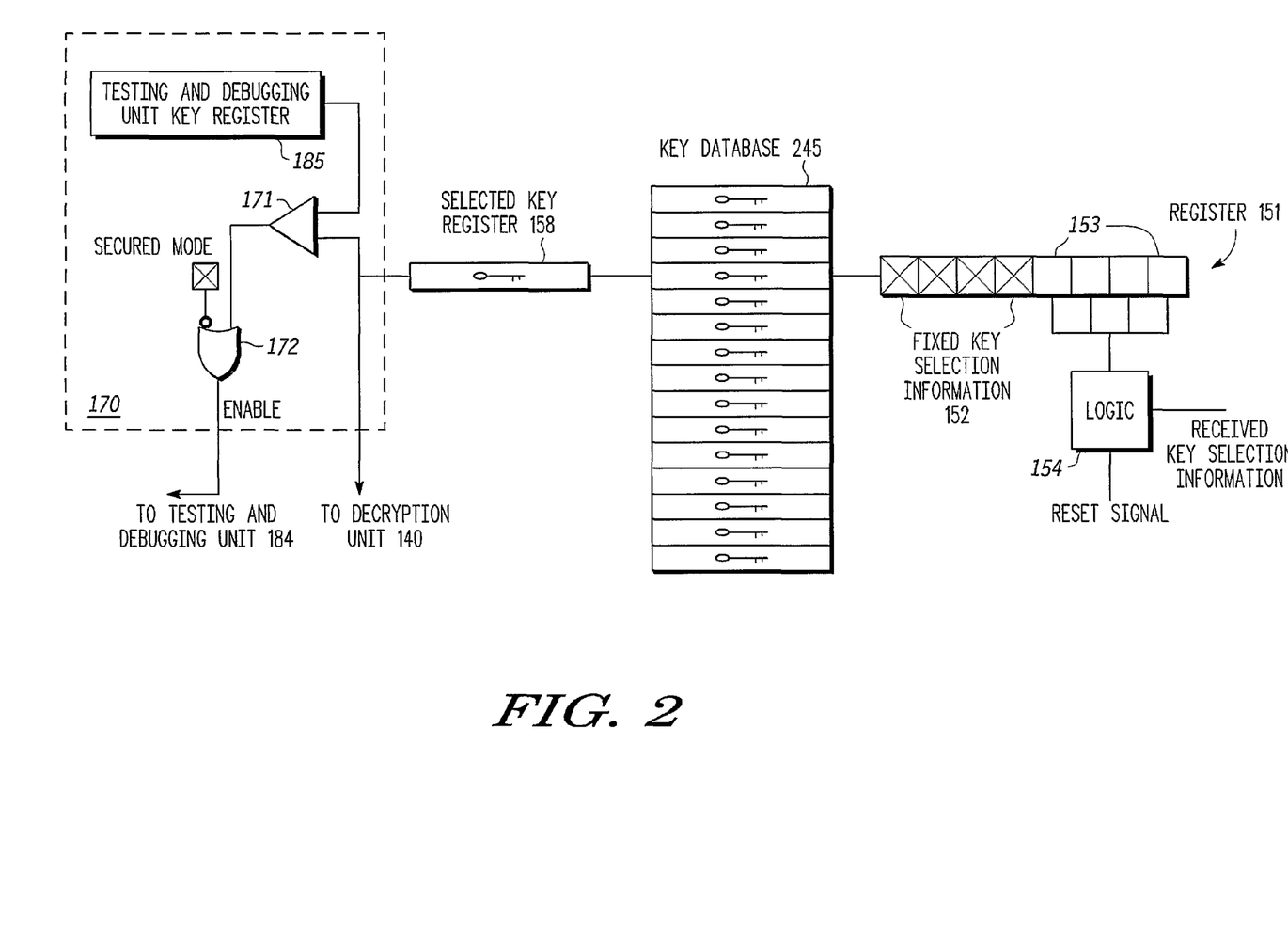
FIG. 2 illustrates a test enable circuit, a decryption unit, a key database and a key selection circuit, according to an embodiment of the invention.

FIG. 2 illustrates a test enable circuit 170, a decryption unit 140, a key database 145 and a key selection circuit 150, according to an embodiment of the invention.

The key selection circuit 150 includes a register 151 that has a fixed portion 152 and multiple cells 153. The cells 153 are connected to logic 154 that is adapted to provide a default value until key selection information is received by the second integrated circuit 102. Logic 154 is also adapted to limit the amount of writing attempts to register 151, and conveniently limits this amount to a single writing attempt after reset. Various logical circuits can be utilized in order to provide this functionality.

The default value can be written to the register during a booting sequence, but can also be set by dedicated hardware. The default value points to a default key that differs from the encryption key.

It is noted that additional attempts to write to the register 151 can cause the system 100 to halt, to generate an intrusion attempt alert, to disregard the attempt, to provide the default key, and the like.

The register 151 points to one entry of the key database 145 and selects one encryption key out of the multiple keys of that database. Each key differs from the other. The selected encryption key can be sent to a selected key register 158.

The inventors used an eight bit register 151 that included four fixed bits and four bits for receiving key selection information. Each encryption key is one hundred and twenty eight bit long. It is noted that these lengths are provided as non-limiting examples.

The test enable circuit 170 includes a comparator 171 and an optional OR gate 172. One input of the comparator 171 is connected to the selected key register 158 and can receive the selected encryption key. Assuming that the key selection circuit 150 selected the right encryption key then the comparator 171 selects between this key to a key provided to its second input. The latter key can be provided via the test and debug unit, as represented by test and debug unit register 185.

If both keys match the comparator 171 sends a test approval signal that can be provided to an enable input of the test and debug unit 184.

According to an embodiment of the invention the output of the comparator 171 is sent to one input of the OR gate 172, while another input of the OR gate 172 received an inverted secured mode signal. The output of the OR gate 172 is connected to an enable input of the test and debug unit 184.

FIG. 3-7 and FIG. 9 illustrate a device booting sequence 300, according to an embodiment of the invention. Dashed lines illustrate the transferring of data or instructions between components.

Sequence 300 starts by an initial stage 310 of providing encrypted instructions and providing a device that is designed such as to limit and even prevent access to decrypted instructions.

Stage 310 is followed by stage 315 of resetting the device. Stage 315 can include resetting only a portion of the device, powering down the device of some of its components, a power failure, and the like.

Figure 3:
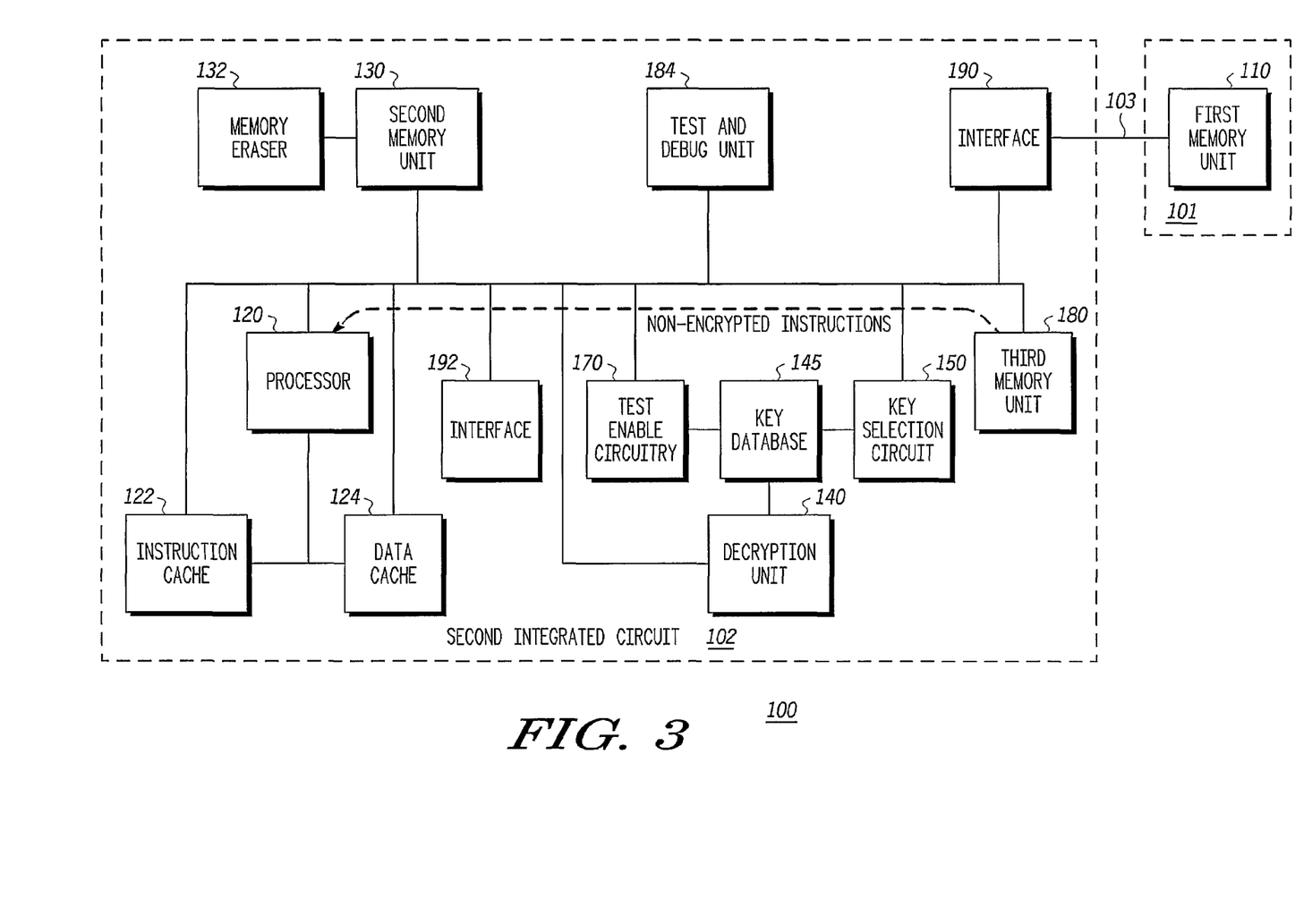
FIGS. 3-7, and FIG. 9 illustrate a device booting sequence, according to an embodiment of the invention.

Stage 315 is followed by stage 320 of retrieving and executing an initial boot code that conveniently is not encrypted.

Stage 320 is illustrated by FIG. 3. The processor 120 retrieves non-encrypted initial booting code from the third memory unit 180. The execution of the initial booting code initiates the decryption session.

Figure 4:
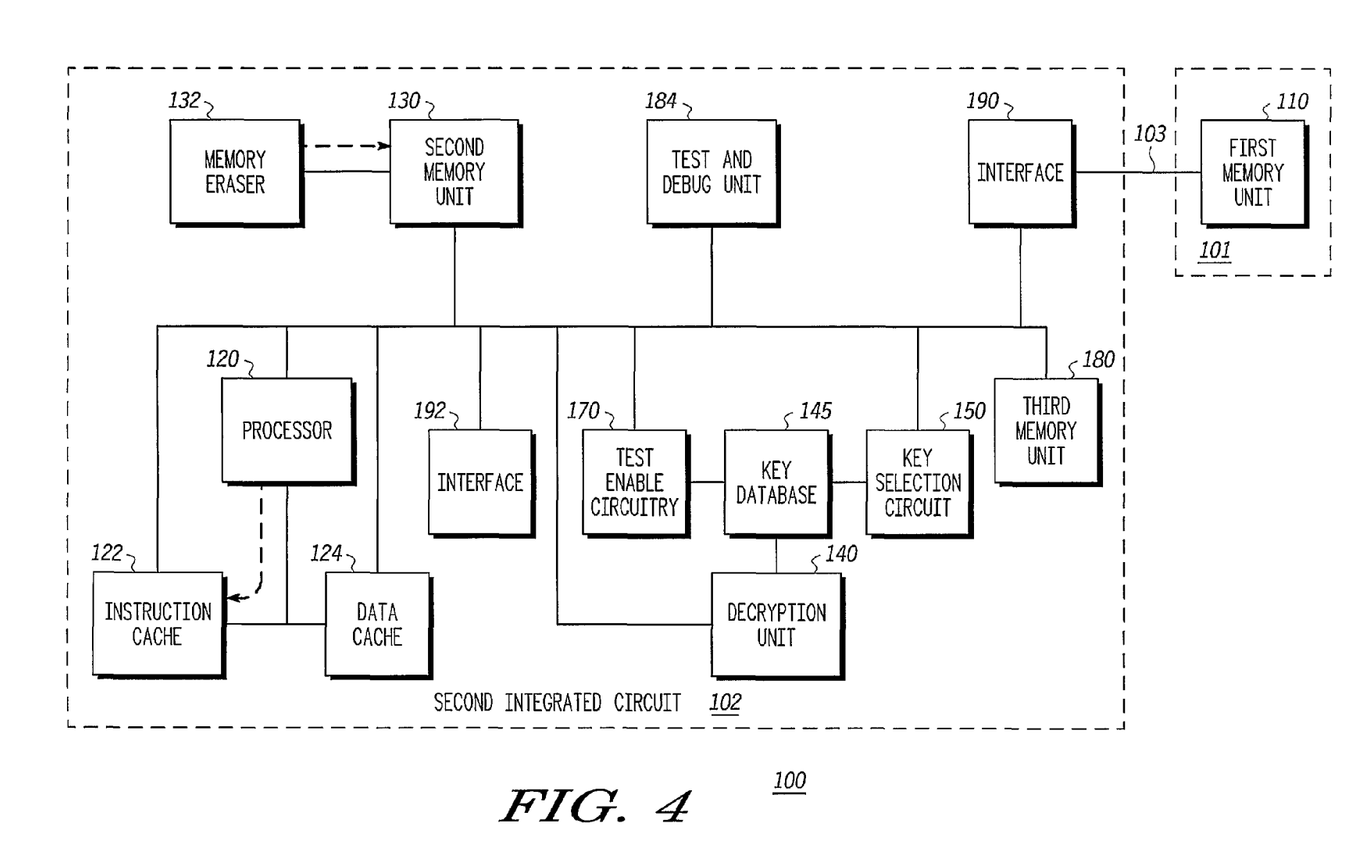

Stage 320 is followed by stage 330 of preventing access to decrypted instructions that were decrypted prior to the resetting. This stage is required as the reset does not necessarily erase the content of various memories.

FIG. 4 illustrates stage 330. The second memory unit 130 or selected entries of said memory unit 120 are deleted. In addition, the instruction cache 122 or selected entries of the instruction cache are invalidated by negating their valid bit. The selected entries usually store (or are suppose to store) decrypted instructions. It is noted that this stage can also include invalidating entries of the data cache 124.

Figure 5:
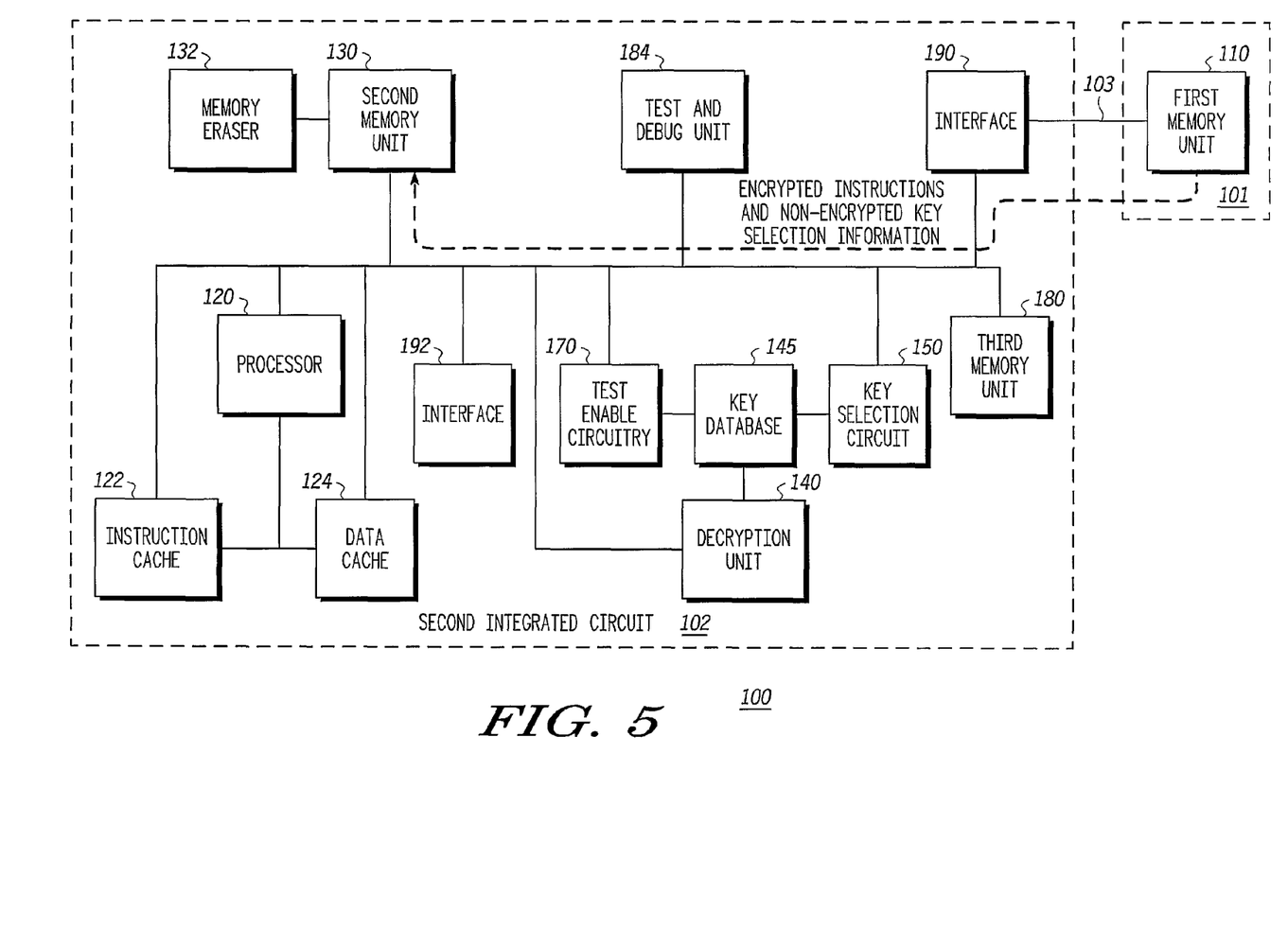

Stage 330 is followed by stage 340 of receiving encrypted instructions.

FIG. 5 illustrates stage 340. The processor 120 controls the downloading of encrypted instructions from the first integrated circuit 101, via interface 190, to the second memory unit 130. It is noted that the first integrated circuit 102 can control the exchange in various manners, including a utilization of a DMA controller. During this downloading the device reads key selection information stored within the first integrated circuit 101.

Figure 6:
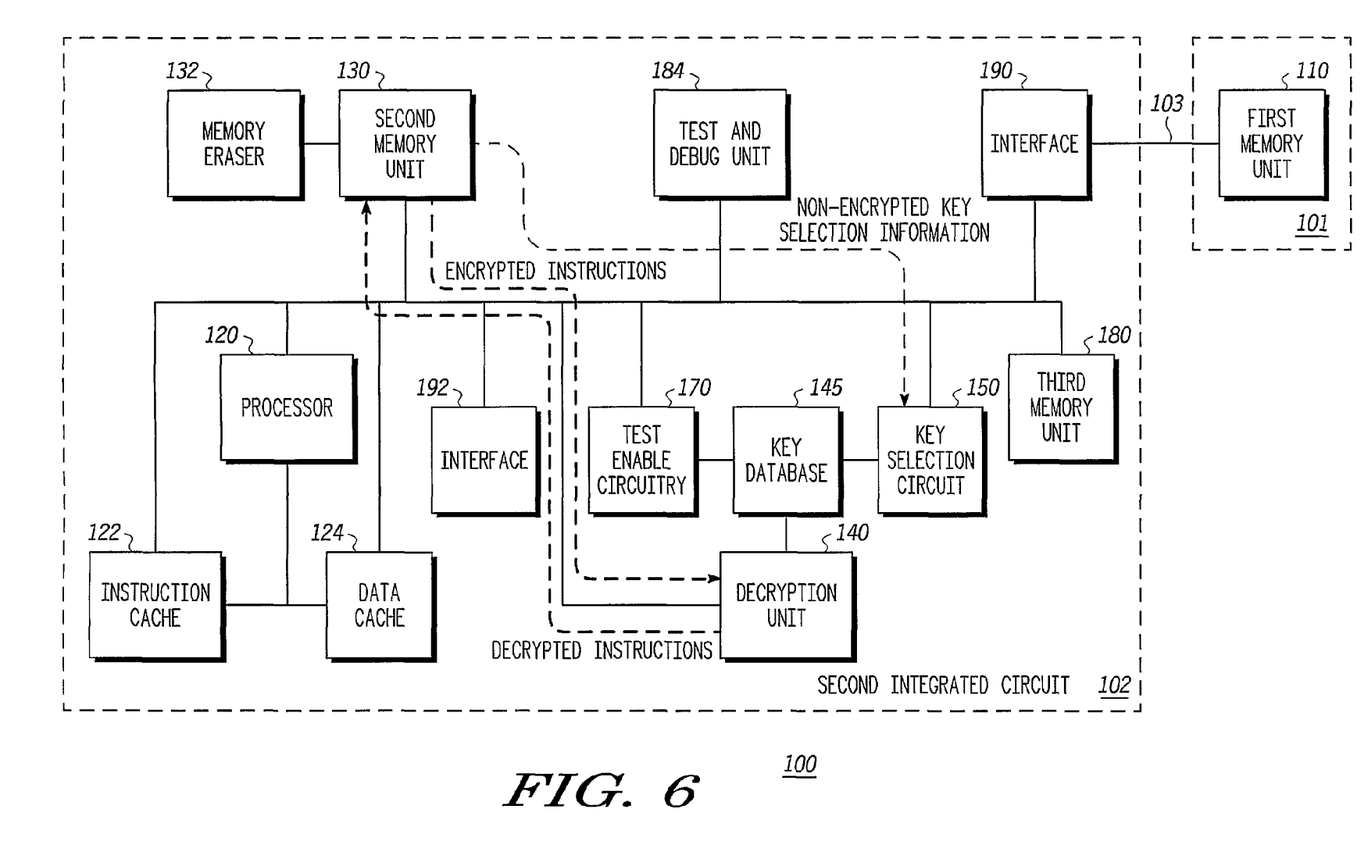

Stage 340 is followed by stage 350 of decrypting and optionally de-hashing the decrypted instructions.

FIG. 6 illustrates stage 350. Device 100, and especially the encryption unit 140 perform de-hashing and decryption. The de-hashing is applied on each group of instructions fetches by the decryption unit 140. If the de-hashing of a group of instructions is successful then these instructions are decrypted and sent, at their decrypted form, to the second memory unit 130. The processor 120 may control the decryption process, for example by sending the key selection information retrieved from the first integrated circuit 101 to the key selection unit 150, by determining which group of instructions is sent to the decryption unit 140, and where to decrypted instructions.

Figure 7:
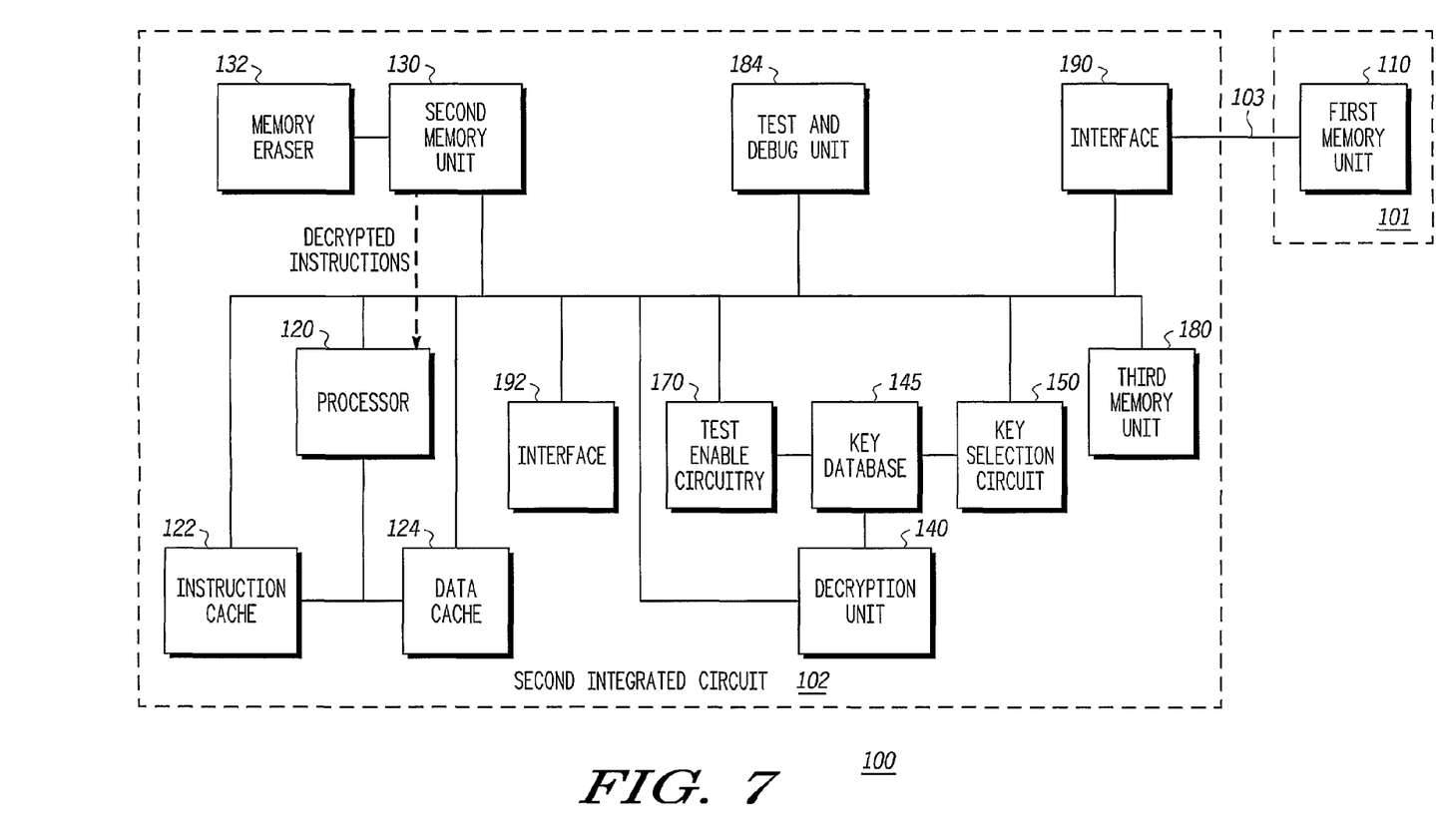

Stage 350 is followed by stage 360 of retrieving decrypted instructions and executing the decrypted instructions. It is noted that the execution of some decrypted instructions can be executed at least in partially in parallel to the decryption of other encrypted instructions. FIG. 7 illustrates stage 360.

FIG. 7 illustrates the end of the booting session in which the processor 120 retrieves decrypted instructions from the second memory unit 130 and executed them.

Figure 9:
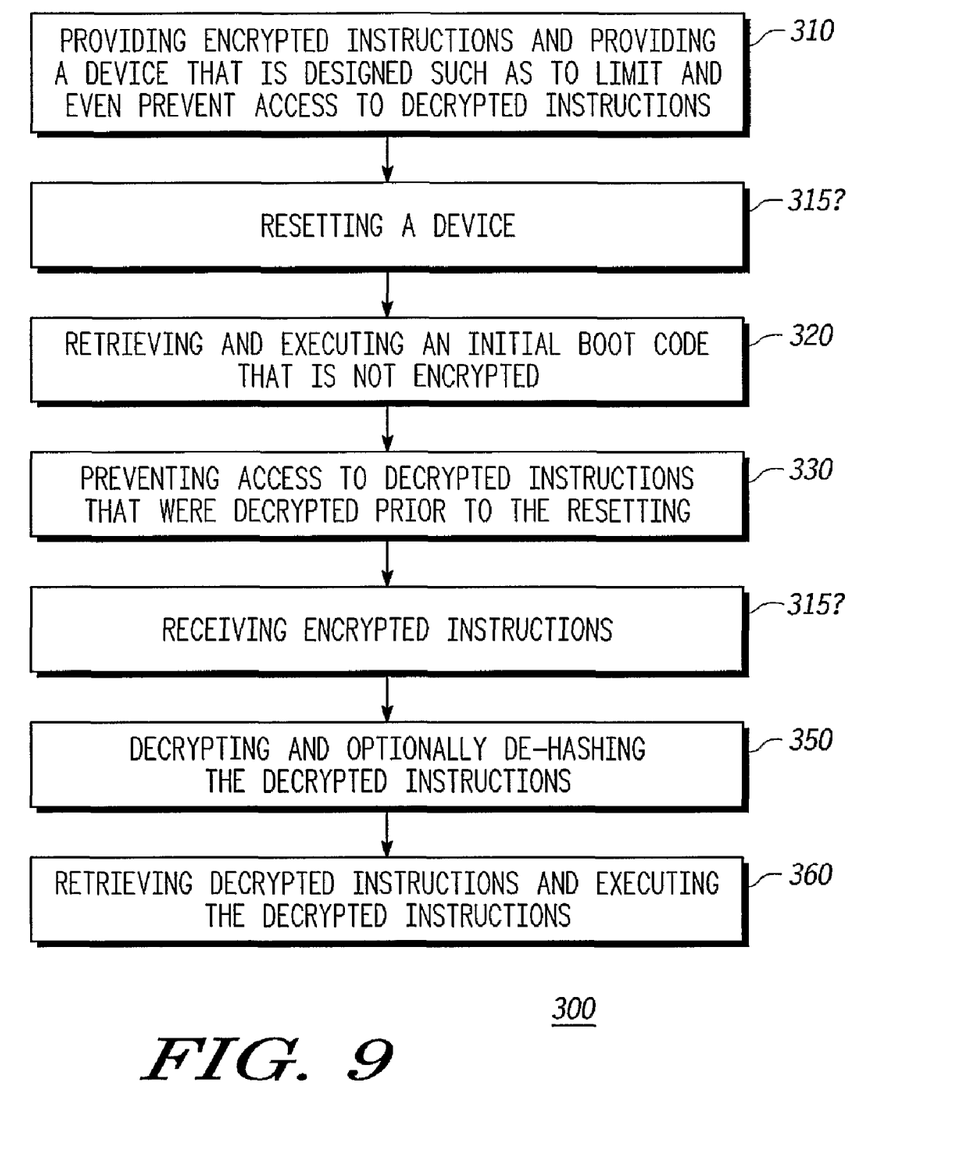

According to an embodiment of the invention the booting sequence further includes retrieving instructions from a fast interface 192, decrypting the instructions and executing them. According to yet a further embodiment of the invention at least some of the decrypted instruction are associated with tasks other then booting the second integrated circuit 102.

Figure 8:
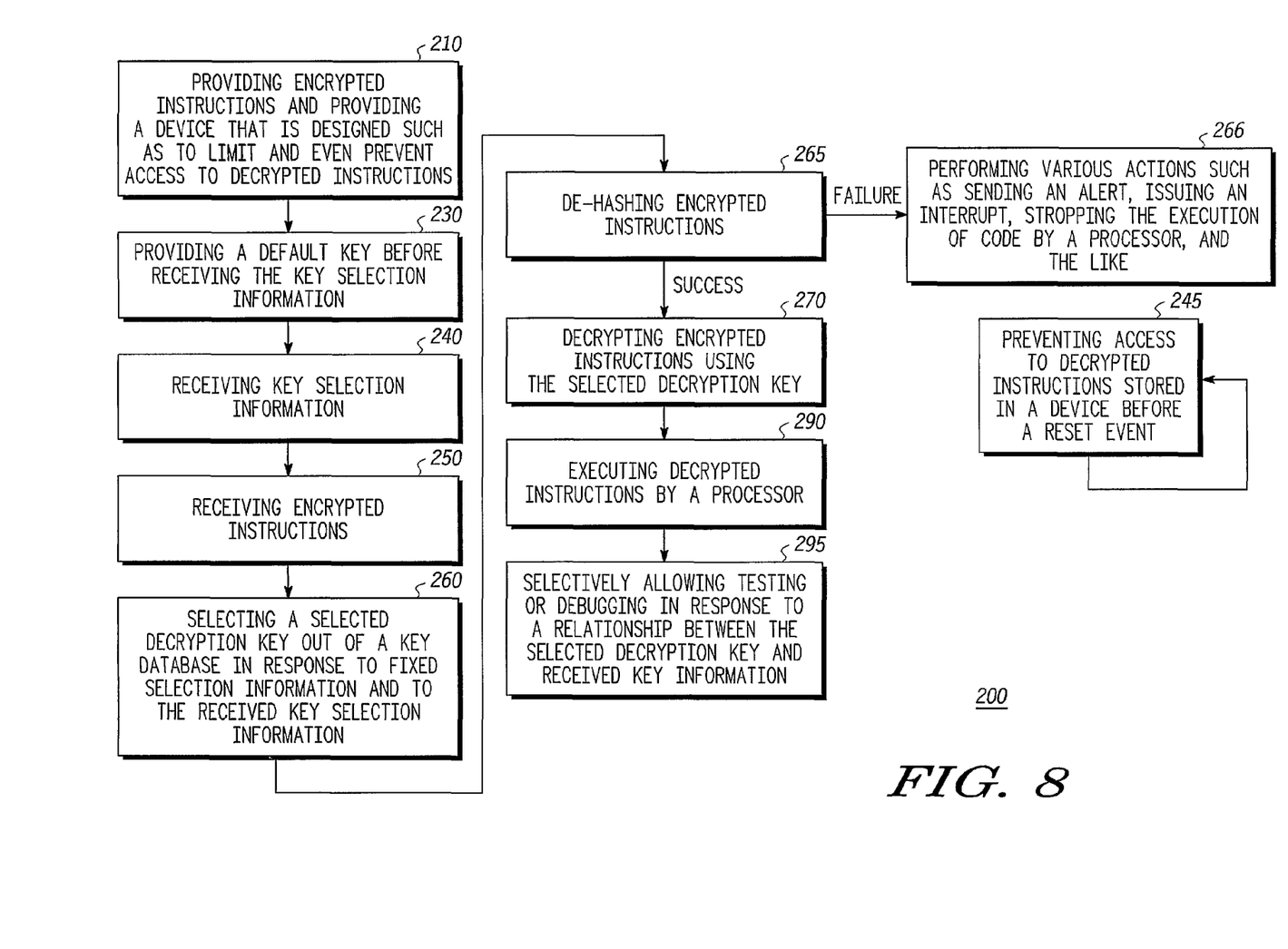
FIG. 8 illustrates a method, according to an embodiment of the invention.

FIG. 8 illustrates a method 200, according to an embodiment of the invention.

Method 200 starts by stage 210 of providing encrypted instructions and providing a device that is designed such as to limit and even prevent access to decrypted instructions.

Stage 210 may include various sub-stages that are executed during various periods, including an integrated circuit design period, device 100 installation period, testing period and normal operational period.

Stage 210 may include designing the device such as to limit access to a key database, limit access to fixed selection information, and the like, as well as designing interfaces that can be instructed from outside the device to directly access entries of memory units that may store decrypted instructions. The limitation can include hardware limitations, such as not connecting various components to I/O interfaces.

Stage 210 may further include determining a fixed key selection information. Conveniently the determination is made by the manufacture of the second integrated circuit 102.

The fixed key information can then be provided to a client, such as another vendor or manufacturer that installs or utilizes the second integrated circuit in his product.

Stage 210 can also include providing a customer with at least one pair of encryption key and key selection information that corresponds to that encryption key.

Conveniently, stage 210 includes encrypting the instructions and optionally also hashing the decrypted instructions using a certain encryption key. The encrypted instructions are then stored at a first memory unit 110.

Stage 210 is followed by stage 230 of providing a default key before receiving the key selection information. The default key differs from the selected encryption key.

Stage 230 is followed by stage 240 of receiving key selection information.

Stage 240 is followed by stage 250 of receiving encrypted instructions. According to an embodiment of the invention the amount of receptions can be limited. Conveniently, after a reset occurred, only a single key selection information can be received reception after reset.

Stage 250 is followed by stage 260 of selecting a selected decryption key out of a key database in response to fixed selection information and to the received key selection information.

Stage 260 is followed by stage 265 of de-hashing encrypted instructions and jumping to the stage 270 of decrypting instructions if the de-hashing is successful.

If the de-hashing is not successful stage 265 can be followed by stage 266 of performing various actions such as sending an alert, issuing an interrupt, stopping the execution of code by processor 120, resetting the device, and the like. Stage 266 can also be a part of a loop that allows certain amount of de-hashing failures without stopping the de-hashing and decryption sessions.

Stage 270 includes decrypting encrypted instructions using the selected decryption key. It is noted that both the de-hashing and decrypting can be applied on groups of the encrypted instructions and that multiple iterations of stages 265 and 270 can be required before the whole encrypted instructions are decrypted successfully.

Stage 270 is followed by stage 290 of executing decrypted instructions by a processor. Conveniently, this stage includes executing only instructions from predefined locations. It is noted that instructions that were decrypted in a decryption process that was controlled by a first processor can be executed by another processor.

Method 200 may include stage 245 of preventing access to decrypted instructions stored in a device before a reset event. Stage 245 can be applied during the design stage of the second integrated circuit and may include limiting the access of interfaces to various memory unit interfaces, and the like. Conveniently, stage 245 is also applied during a booting sequence of the second integrated circuit 102 and can be applied as a part of the sequence of stages 230-295.

Conveniently, stage 245 includes invalidating instruction cache entries after reset. Conveniently, stage 245 includes erasing memory unit entries. Conveniently, stage 245 includes allowing a testing unit to read an entry of a memory unit only after the testing unit wrote to that entry.

Stage 290 can be followed by stage 295 of selectively allowing testing or debugging of the device in response to a relationship between the selected decryption key and received key information. This stage can include receiving a request to test or debug the second integrated circuit, waiting to receive a decryption key, and allowing the testing or debugging only if the provided decryption key matches the selected decryption key.

Either stages 290 or 295 can be followed by stage 230 once a reset occurred. The reset can result from a shut down of device 100, form power failures, and the like.

Stage 295 can be followed by stage 290. If there is a need to decrypt additional instructions that were not previously decrypted then stage 290 can be followed by stage 250.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A device comprising:
a first memory unit adapted to store encrypted instructions;
a processor adapted to execute decrypted instructions;
a decryption unit;
a key database comprising a plurality of storage locations, each storage location storing a decryption key;
a selection register to store a selection value, a first portion of the selection value being fixed and user un-modifiable, and a second portion of the selection value to be provided by the user and stored at a volatile storage location, wherein the first portion includes at least one fixed and user un-modifiable bit of the selection value and the second portion includes at least one user provided bit of the selection value; and
a key selection circuit to select a first decryption key from the key database for decrypting encrypted instructions based upon the selection value stored at the selection register.

2. The device according to claim 1 further adapted to perform de-hashing of the encrypted instructions and in response to a result of the de-hashing determine whether to decrypt the encrypted instructions.

3. The device according to claim 1, wherein the key selection circuit is adapted to limit an amount of receptions of the user provided portion of the selection value.

4. The device according to claim 1, wherein the key selection circuit is adapted to allow one reception of the user provided portion of the selection value after being reset.

5. The device according to claim 1, wherein the device is adapted to erase multiple entries of a second memory unit after reset.

6. The device according to claim 1, wherein the processor retrieves information from an instruction cache and wherein the device is adapted to invalidate instruction cache entries after reset.

7. The device according to claim 1, wherein the key selection circuit is adapted to select a default key until receiving the user provided portion of the selection value.

8. The device according to claim 1, wherein during test mode a test circuit reads an entry of a second memory unit only after previously writing to the entry.

9. The device according to claim 1, wherein the processor is adapted to execute only predefined instructions.

10. The device according to claim 1, further comprising a test circuit adapted to selectively facilitate testing or debugging of the processor in response to a comparison between the selected decryption key and the received user provided portion of the selection value.

11. The device according to claim 1, the processor is further adapted to prevent access to the key database and to the fixed and user un-modifiable portion of the selection value.

12. A method implemented at a processor device, the method comprising:
receiving encrypted instructions;
storing a user provided value at a second portion of a selection register, the selection register comprising a first portion that is fixed and user un-modifiable, and the second portion that is volatile memory location where the user provided value is stored, wherein a selection value stored at the selection register comprises the first portion, having at least one fixed un-modifiable bit, and the second portion having at least one user provided bit;
selecting by the processor device based upon the selection value, a first decryption key from a key database, the key database comprising a plurality of storage locations, each storage location storing a decryption key; and
decrypting encrypted instructions using the selected decryption key.

13. The method according to claim 12 further comprising de-hashing the encrypted instructions and jumping to the stage of decrypting in response to determining the de-hashing is successful.

14. The method according to claim 12, further comprising limiting an amount of receptions of the user provided portion of the selection value.

15. The method according to claim 14 wherein the limiting comprises allowing a single reception of the user provided portion of the selection value after reset.

16. The method according to claim 12, further comprising preventing access to decrypted instructions stored in a device before a reset event.

17. The method according to claim 16 wherein the preventing comprises invalidating instruction cache entries after reset.

18. The method according to claim 16 wherein the preventing comprises erasing memory unit entries.

19. The method according to claim 16 wherein the preventing comprises allowing a testing unit to read an entry of a memory unit only after the testing unit wrote to that entry.

20. The method according to claim 12, further comprising providing a default key before receiving the user provided portion of the selection value.

21. The method according to claim 12, further comprising executing only instructions from predefined locations.

22. The method according to claim 12, further comprising selectively allowing testing or debugging in response to a relationship between the selected decryption key and the received user provided portion of the selection value.

23. The method according to claim 12, further comprising preventing access to the key database and to the fixed and user un-modifiable portion of the selection value.

* * * * *